March 11, 1969
K. HELVOIGT
3,432,249
HAND HELD GAS-BURNING DENTAL TOOL
Filed June 9, 1967
Sheet 1 of 2
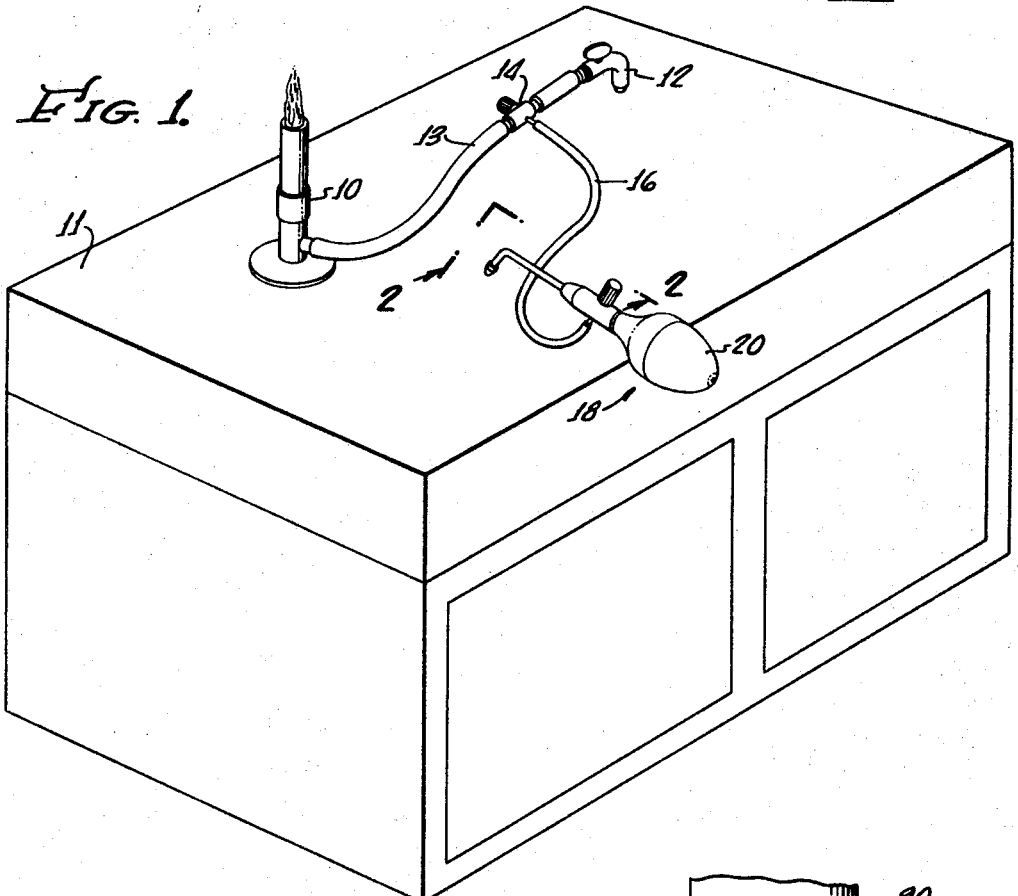
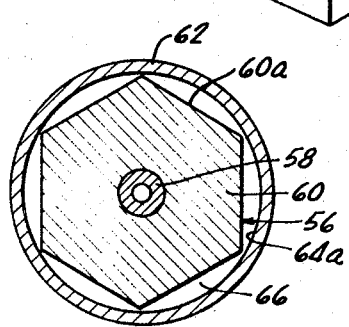
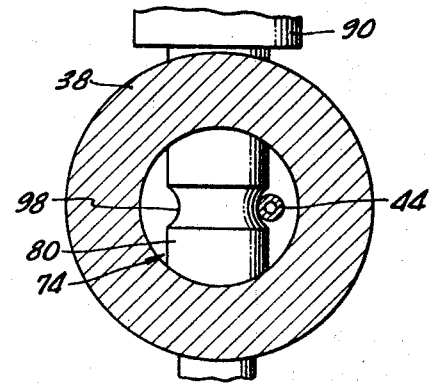
INVENTOR.
KENNETH HELVOIGT
BY FOWLER, KNOBBE & MARTENS
ATTORNEYS.

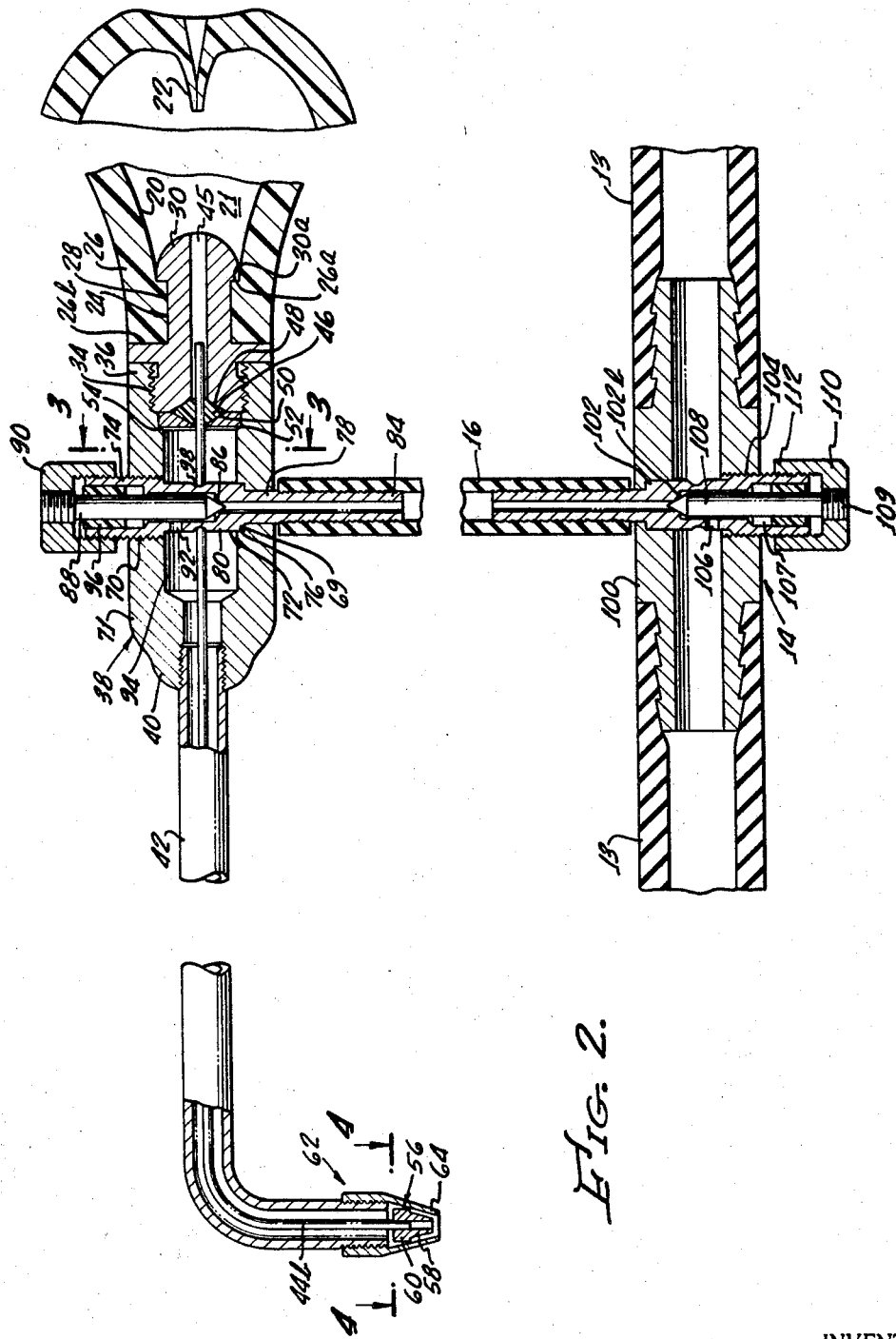

United States Patent Office 3,432,249
Patented Mar. 11, 1969

3,432,249
HAND HELD GAS-BURNING DENTAL TOOL
Kenneth Helvoigt, 1325 Mariner Drive,
Newport Beach, Calif. 92660
Filed June 9, 1967, Ser. No. 645,043
U.S. Cl. 431—252                6 Claims
Int. Cl. F23d 13/24

ABSTRACT OF THE DISCLOSURE

A hand-held burner includes a squeeze bulb for supplying supplementary air through a very small diameter tube to the burner nozzle. A casing and an outer tube which leads from the casing surround the air tube. Gaseous fuel admitted into the casing by means of an adjustable valve is directed out the end of the large diameter tube where it mixes with air and burns. Air from the squeeze bulb hastens combustion to produce a hotter flame when desired.

Background of the invention

This invention relates to hand-held heating devices and more particularly to a device for creating a small gas flame useful in dental art or in similar laboratory work.

In dental work it is frequently necessary to apply carefully controlled heat for flowing or smoothing waxes, warming artificial teeth, removing broken artificial teeth and other uses. In the past, this has been attempted with Bunsen burners or heated spatulas. However, the Bunsen burner flame is difficult to control and the burner is clumsy to handle. Spatulas, on the other hand, have not been satisfactory in smoothing wax patterns.

It is desirable that means be provided to apply the heat in a more convenient and effective manner. Preferably, the user should be able to hold the heat providing means in one hand so that the other hand is free, and so that heat may be applied to the work readily and instantly as needed. Since the amount of heat required is variable but small, very fine control over the supply of air and fuel is highly desirable. Also, the device should be simply constructed for ease of use and manufacturing.

Summary of the invention

In accordance with this invention, there is provided an improved hand-held tool for applying a small, controlled, blue flame to dental work. The tool comprises a flexible hand-squeezeable hollow bulb, having an air outlet and a one-way valve inlet. A very small diameter tube is connected to the air outlet. A tubular casing supported by the bulb, but sealed from the bulb interior, surrounds the upstream end of the small tube. A large diameter tube is attached to and opens into the tubular casing and surrounds the remainder of the small diameter tube and terminates adjacent to the downstream end of the small tube. A gaseous fuel supply is connected to the casing and an adjustable valve mounted on the casing controls the flow of fuel into the casing. The fuel entering the casing is ducted through the large diameter tube to be burned at the outlet of the tube.

Normally, only a slow-burning, yellow flame is produced by the fuel and the surrounding air; however, when material is to be warmed, the operator of the tool can squeeze the bulb and regulate the gas valve with fingertip action to produce a suitable blue flame.

As pressure on the bulb is released, there is naturally a slight suction created at the end of the small diameter tube. To prevent the flame from being extinguished by such suction, it has been found desirable to maintain the diameter of the tube no greater than approximately .012 of an inch. Such small diameter also prevents a jet of air produced by the bulb from extending the flame undesirably, and together with the bulb allows for the control of the combustion air.

To maintain a fine adjustment over the fuel supplied to the tool, a tubular valve body is mounted extending across the casing and having an internal valve seat which cooperates with a needle valve stem mounted on the valve body to control flow through an opening of the valve body into the tool casing. The valve stem control is located to be easily manipulated by the thumb and first finger of the same hand holding the bulb. This provides easy flame control and assists in properly directing the flame.

Detailed description of the invention

For a more thorough understanding of the invention, refer to the following detailed description and drawings wherein:

FIG. 1 is a perspective schematic view of a work station where the dental tool of the invention is likely to be used;

FIG. 2 is a cross-sectional view of the tool shown in FIG. 1;

FIG. 3 is a cross-sectional view on line 3—3 of FIG. 2; and

FIG. 4 is a cross-sectional view on line 4—4 in FIG. 2.

Referring now to FIG. 1, there is a Bunsen burner 10 on a work table 11 connected to a gas outlet 12 by a suitable hose 13. A suitable adjustable regulator valve 14 in the hose bleeds off a portion of the gas flow to a smaller hose 16 connected to the tool 18 of the invention. As mentioned, typical uses for the tool are warming and smoothing waxes and wax patterns, and removing broken teeth from dentures. In these processes, it is necessary to soften the wax or plastic. This can be done with the dental tool 18 held in one hand.

As can be seen from FIG. 2, the tool 18 includes a hand-squeezeable, hollow bulb 20 made of plastic or rubber-like material having a one-way valve 22 defining an air inlet in one end of the bulb. A metal adapter 24 is positioned in the opposite end of the bulb which is extended slightly to form a tubular neck 26 that tightly engages a section 28 of reduced diameter on the adapter so that an air-tight connection is made. The right end 30 of the adapter is enlarged with respect to the section 28 and the inner diameter of the bulb neck 26. Also, the end 30 is rounded on its outer surface so that the adapter may be inserted into the outlet in the bulb by stretching the bulb material until a flange 30a engages a shoulder 26a at the inner end of the neck 26. The outer end 26b of the bulb engages an outwardly extending flange 32 formed on the adapter 24.

The left end 34 of the adapter 24 fits within and is threaded to the right end 36 of an enlarged tubular casing 38. The other end 40 of the casing 36 tapers to a smaller inner diameter and is internally threaded to cooperate with an outer tube 42 opening directly into the casing.

A tube 44 of smaller diameter extends through the outer larger tube 42 and through the casing 38 into the small diameter passage 45 in the adapter 24. Thus, the intake end 44a of the small diameter tube 44 opens into the interior 21 of the bulb.

To seal the casing from the bulb, there is provided a ferrule 46, made of slightly deformable plastic or similar material, surrounding the small diameter tube. The ferrule has a flattened conical shape on either end, one end cooperating with a conical counter sink 48 formed in the end of the adapter. The other end of the ferrule 46 cooperates with a similar counter sink 50 in a washer 52 abutting an inwardly extending annular shoulder 54 formed on the inner wall of the casing 38. As can be seen, the ferrule 46 is sandwiched between the washer and the inner end of the adapter so that the ferrule material is forced by the counter sinks 48 and 50 against the small diameter tube 44, thus, providing an effective seal for the prevention of fluid communication between the casing and the bulb interior.

The inner and outer tubes 42 and 44 are bent approximately 90° near their downstream ends so that the flame to be provided by the tool can be most conveniently directed at the work. The downstream ends of the tubes terminate in the same general area, with the smaller diameter tube 44 extending slightly beyond the larger diameter tube 42. A tubular centering member 56 having a frusto-conical forward portion 58 and a flat-sided rear portion 60 is attached to the end of the inner tube 44. A tubular tip 62 or nozzle having a frusto-conical forward portion 64 is threaded to the downstream end of the large diameter tube and engages the downstream edges of the flat-sided surfaces 60a on the rear 60 of the centering member 56. This causes the end of the smaller diameter tube 44 to be concentrically positioned within the large diameter tube and provides a more stable and controllable flame. The flat-sides surfaces 60a on the rear portion 60 of the centering member 56 define chordal spaces 66 with the surrounding nozzle portion 64a (FIG. 4) which permit gaseous flow through the large diameter tube 42 and out the end of the nozzle 62. The position of the nozzle 62 relative to the ends of the tube can be adjusted by the threaded connection.

The casing 38 is provided with an opening 68 in its lower sidewall 69 as indicated in FIG. 2, and a larger threaded opening 70 in the upper sidewall 71 aligned with the smaller opening 68. A tubular valve body 72 inserted through the opening 70 extends across the casing 38 into the smaller opening 68. The larger diameter end 74 of the valve body 72 is threaded into the upper larger diameter opening 70 until a shoulder 76 between the smaller end 78 of the valve body 72 and a middle section 80 engages a shoulder 69 at the inner end of the opening 68. The smaller end 78 of the valve body is snugly connected to the fuel hose 16, and may be threaded, if desired, to prevent slippage. The passage 82 within the valve body increases in diameter midway through the body from the intake end 84 of the valve body to form an inner annular valve seat 86.

A needle valve stem 88 threadably attached to a cap 90 cooperates with the valve seat 86 to control the flow of gaseous fuel into the larger end of the valve body. An outlet 92 formed in the sidewall of the large end of the valve body opens into the interior of the casing so that as the gaseous fuel flows past the valve seat and the lower end of the valve stem, it is free to escape into the casing interior 94. The valve stem cap 90 is internally threaded to cooperate with threads formed on the outer surface on the larger end 74 of the valve body to close that end. A bushing 96 made of slightly resilient plastic or similar material snugly surrounds the valve stem 88 and fits within the larger end 74 of the valve body 72 to prevent gas leakage. The bushing also provides friction to cause the valve stem to remain where positioned.

It should be noted that the valve construction is quite simple and easy to fabricate and operate. It is necessary in operation of the tool that the control provided by the valve stem be quite precise. Thus, it is important that the valve stem 88 cooperate accurately with the valve seat 86. By having the valve stem cap 90 carrying the valve stem 88 threaded directly to the valve body 72, alignment problems are minimized. The position of the valve stem 88 with respect to the valve seat 86 is independent of the position of the valve body within the casing 38.

The outer periphery of the valve body 72 is formed with an annular groove 98 within which the small diameter tube 44 normally is located as shown in FIG. 3. Since the valve body is centrally positioned through the casing, it is necessary to bend the small tube slightly to pass through the casing between the large diameter tube 42 and the adapter 24. This may cause the smaller tube to be slightly off center within the upstream end of the large tube 42, but the centering member 56 adequately concentrically positions the downstream ends.

In operation, the tool requires only a small gas flow. Hence, the control valve 14 in the main gas hose 13 is set to provide limited gas flow to the tool. The valve 14 includes a short tube 100 having annular ribs on each end to provide a sealed connection to the hose 13 and to resist disconnection. A tubular valve body 102 similar to the valve body 72 extends across the tube 100 and is threaded into an opening 104 in the tube 100. An opening 106 leads into the passage 107 within the valve body 100 to a valve seat 102b. A needle valve stem 108 threadably attached to a cap 110 cooperates with the valve seat 106 to control gas flow into the hose 16. Surrounding the valve stem 108 is a tubular bushing 109 made of slightly resilient plastic or similar material. A suitable adjustable stop 112 may be provided on the control valve body adjacent to the cap 110 to mark the point for the maximum flow required.

The adjustable valve stem cap 90 on the tool casing 38 provides a finger-tip control for maintaining the desired gas flow. Thus, the gas entering the casing interior 94 is ducted through the large diameter tube 42 and out of the nozzle 62 where it mixes with the air at the outlet and thus may be ignited to form a flame.

When the operator is not attempting to warm something with the tool, the bulk 20 is usually not used to provide air and a short, hollow, yellow flame is obtained. When the tool is employed to warm material, such as wax, the operator simply squeezes the bulb as necessary to provide a small jet of air flowing out the nozzle end of the small diameter tube in the middle of the flame. This instantly produces a longer, slimmer, blue, higher temperature flame to provide more direct, precise, and rapid warming.

It has been found that it is quite critical that the inner diameter of the smaller tube should be very small so that air flow is limited. A problem encountered with prior unsuccessful attempts is that with a large flow, it is possible to make undesirably large fluctuations of flame length occur as pressure on the bulb is varied. Also, with large diameter tubes, the relatively small flame may be drawn into the inner tube when pressure on the bulb is released after being squeezed in that a suction is naturally created at the end of the tube. These problems are avoided and best results have been obtained by making the diameter of the inner tube no greater than approximately .011 or .012 of an inch. A practical minimum diameter is approximately .006 of an inch. Since the volume of the bulb 20 is quite large relative to the flow capacity of the tube 44, a jet of air may be maintained for several seconds with one squeeze of the bulb. This provides a smooth burning, steady flame which enhances the heating operation.

If a larger or warmer flame is desired, the operator can simply rotate the valve stem cap 90 to increase the amount of gaseous fuel flowing into the tool. As mentioned, this may be done with the fingers of the same hand holding the bulb.

What is claimed is:
1. A hand-held gas-burning dental tool comprising:
 a flexible hand-squeezable hollow bulb having an air inlet and an air outlet in its walls with a one-way valve in the inlet;
 a very small diameter tube having its upstream end extending through said outlet and opening into the interior of the bulb;
 a tubular casing connected to the bulb and surrounding the upstream end of said small tube;
 a large diameter tube surrounding the remainder of said small diameter tube having its upstream end attached to and opening into said tubular casing and its downstream end terminating adjacent to the downstream end of the small tube;

seal means extending between said casing and said small tube at said bulb outlet for preventing gaseous flow from the casing into the bulb; and a tubular valve body extending transversely across said casing and through the walls of the casing, the inlet end of said valve body being adapted to be connected to a gaseous fuel supply conduit, a fuel outlet opening formed in said valve body connecting the interior of said valve body and the interior of said casing, an annular valve seat formed in the interior of said valve body between said opening and the inlet end of said valve body, and an axially movable valve stem threadably mounted in the other end of said valve body to cooperate with said valve seat for controlling the flow of fuel through said valve seat.

2. A hand-held gas-burning dental tool comprising:

a flexible hand-squeezable hollow bulb having an air inlet and an air outlet in its walls with a one-way valve in the inlet;

a very small diameter tube having its upstream end extending through said outlet and opening into the interior of the bulb;

a tubular casing connected to the bulb and surrounding the upstream end of said small tube;

a large diameter tube surrounding the remainder of said small diameter tube having its upstream end attached to and opening into said tubular casing and its downstream end terminating adjacent to the downstream end of the small tube;

means for concentrically positioning the downstream ends of said tubes;

a nozzle threadably attached to the outer downstream end of said large tube for adjusting the position of the nozzle relative to the downstream end of said tube;

seal means extending between said casing and said small tube at said bulb outlet for preventing gaseous flow from the casing into the bulb; and adjustable valve means attached to said tubular casing for introducing gaseous fuel into said casing.

3. A hand-held gas-burning dental tool comprising:

a flexible hand-squeezable hollow bulb having an air inlet and an air outlet in its walls with a one-way valve in the inlet;

a very small diameter tube having its upstream end extending through said outlet and opening into the interior of the bulb;

a tubular casing connected to the bulb and surrounding the upstream end of said small tube;

a large diameter tube surrounding the remainder of of said small diameter tube having its upstream end attached to and opening into said tubular casing and its downstream end terminating adjacent to the downstream end of the small tube;

seal means extending between said casing and said small tube at said bulb outlet for preventing gaseous flow from the casing into the bulb;

adjustable valve means attached to said tubular casing for introducing gaseous fuel into said casing;

a fuel hose connected to said valve means; and an adjustable regulator valve positioned in said fuel hose and regulating the quantity of fuel which can flow to said valve means.

4. The tool of claim 1 wherein said valve stem is attached to a cap having interior threads for cooperating with threads formed on the exterior of said other end of said valve body.

5. The tool of claim 1 wherein said tubular valve body has an annular groove formed in its exterior surface, said small tube normally being positioned within said annular groove.

6. A hand-held dental tool comprising:

a flexible hand-squeezable bulb having a one-way valve formed in the wall of the bulb for admitting air into the bulb;

a tubular adapter having one end secured in the wall of said bulb to form an air outlet;

a small diameter tube having an air intake end extending said adapter, and a nozzle end extending away from the bulb;

a tubular casing surrounding a portion of said small tube and having one end connected to said adapter;

a sealing ferrule compressed against said small tube and the end of said adapter for preventing fluid flow between the casing and the bulb;

a large diameter tube surrounding said small diameter tube having one end attached to and opening into the other end of said tubular casing and having a nozzle end terminating slightly before the nozzle end of the small tube;

a centering member attached to the nozzle end of said small tube;

a tubular nozzle threadably attached to the nozzle end of said larger tube and surrounding and engaging said centering member so that the nozzle ends of said tubes are concentrically positioned, the exterior of said centering member being formed so that a plurality of spaces extend between the centering member and the surrounding nozzle to permit fluid flow through the large tube and said nozzle;

a tubular valve body extending transversely across said casing through the walls of the casing, the inlet end of said valve body being adapted to be connected to a gaseous fuel supply conduit, a fuel outlet opening formed in said valve body connecting the interior of said valve body and the interior of said casing, an annular valve seat formed in the interior of said valve body between said opening and the inlet end of said valve body;

an axially movable valve stem for controlling the flow of fuel through said valve seat; and a cap attached to said valve stem and threadably attached to the other end of said valve body for permitting manual adjustment of the valve.

References Cited

UNITED STATES PATENTS

| | | | |
|---|---|---|---|
| 1,282,997 | 10/1918 | Waldmeier | 431—252 |
| 2,860,009 | 11/1958 | Orr | 239—362 X |

CHARLES J. MYHRE, *Primary Examiner.*

EDWARD G. FAVORS, *Assistant Examiner.*